United States Patent
Thein et al.

(10) Patent No.: US 12,151,690 B2
(45) Date of Patent: Nov. 26, 2024

(54) METHOD AND SYSTEM FOR OPERATING AN AT LEAST PARTIALLY AUTOMATED VEHICLE

(71) Applicant: Robert Bosch GmbH, Stuttgart (DE)

(72) Inventors: Christoph Thein, Hildesheim (DE); Frank Schoenmann, Nuremberg (DE); Hans-Leo Ross, Lorsch (DE); Jan Wiese, Stuttgart (DE); Tobias Frye, Braunschweig (DE)

(73) Assignee: ROBERT BOSCH GMBH, Stuttgart (DE)

( * ) Notice: Subject to any disclaimer, the term of this patent is extended or adjusted under 35 U.S.C. 154(b) by 272 days.

(21) Appl. No.: 17/662,393

(22) Filed: May 6, 2022

(65) Prior Publication Data
US 2022/0402512 A1 Dec. 22, 2022

(30) Foreign Application Priority Data
Jun. 18, 2021 (DE) ..................... 10 2021 206 297.0

(51) Int. Cl.
*B60W 60/00* (2020.01)
*B60W 50/02* (2012.01)

(52) U.S. Cl.
CPC ...... *B60W 50/0205* (2013.01); *B60W 60/001* (2020.02); *B60W 2554/404* (2020.02); *B60W 2556/45* (2020.02)

(58) Field of Classification Search
None
See application file for complete search history.

(56) References Cited

U.S. PATENT DOCUMENTS

| | | | |
|---|---|---|---|
| 2021/0109881 A1* | 4/2021 | Moustafa | B60W 60/001 |
| 2021/0173399 A1* | 6/2021 | Richard | B60W 30/146 |
| 2022/0274609 A1* | 9/2022 | Kurokawa | B60W 50/0205 |

FOREIGN PATENT DOCUMENTS

| | | |
|---|---|---|
| DE | 102014112194 A1 | 3/2015 |
| DE | 102016121691 A1 | 5/2018 |
| DE | 102017011329 A1 | 7/2018 |
| DE | 102017218438 A1 | 4/2019 |
| DE | 102018207194 A1 | 11/2019 |
| DE | 102019216989 A1 | 5/2020 |

OTHER PUBLICATIONS

International Standard ISO 26262-1 Road vehicles—Functional safety—Part 1, (2018), Switzerland, pp. 1-42.

* cited by examiner

*Primary Examiner* — James M McPherson
(74) *Attorney, Agent, or Firm* — NORTON ROSE FULBRIGHT US LLP; Gerard A. Messina

(57) ABSTRACT

A method for operating an at least partially automated vehicle. The method includes: supplying surroundings data detected with the aid of sensors to at least three AI computing units which are independent of one another; generating data regarding at least one object from the surroundings data; carrying out a plausibility check of the pieces of data with respect to one another with the aid of majority voting; and using the data for which the plausibility check has been carried out for controlling, at least in a semi-automated manner, a lateral and/or longitudinal guidance of the at least partially automated vehicle.

13 Claims, 3 Drawing Sheets

METHOD AND SYSTEM FOR OPERATING AN AT LEAST PARTIALLY AUTOMATED VEHICLE

CROSS REFERENCE

The present application claims the benefit under 35 U.S.C. § 119 of German Patent Application No. DE 10 2021 206 297.0 filed on Jun. 18, 2021, which is expressly incorporated herein by reference in its entirety.

FIELD

The present invention relates to a method for operating a vehicle. The present invention furthermore relates to a system for operating a vehicle. The present invention furthermore relates to a computer program product.

BACKGROUND INFORMATION

Where technical systems take over human tasks, not only do the technical systems have to implement optical and acoustical capabilities at least equivalent to humans, but additionally potential error responses or adaptations to operational negative influences, such as glare, shadow formation, etc. must be compensated for at least in an equivalent manner. Known safety systems are based on diagnoses and redundancies, which release or directly activate corresponding actuators in a comparator. In aircraft engineering, votings (selection methods) at the device level are known and require triple-redundant electronics, microprocessor device-based voting systems being used for specific safety tasks.

Conventional surroundings recognition (environmental sensing) systems have many technical shortcomings or have limitations when it comes to mapping reality in correct digital data, and generally also have significant deficiencies with respect to external surroundings and infrastructure influences. In general, sensor systems based on radar, laser, camera, etc. are purely technical detection systems, which are only trained, calibrated, scaled, etc., adapted to typical application cases, such as, e.g., passenger compartment recognition, object recognition, etc., based on empirical experience structures.

German Patent Application No. DE 10 2017 218 438 A1 describes a method and a system for operating a vehicle as well as furthermore a computer program product. A sensor device is described, including at least two technologically diversified sensor units, a detection of pieces of surroundings information being carried out with the aid of the sensor device, a defined evaluation of the pieces of surroundings information detected by the technologically diversified sensor units in terms of plausibility being carried out, and a defined use of the pieces of information being carried out using a result of the defined evaluation of these detected pieces of surroundings information.

German Patent Application No. DE 10 2014 112 194 A1 describes a controller for an electric motor in an electric vehicle and a method therefor, the controller including, among other things, a voting control module and a bridging module, the voting control module receiving an error signal from one of the two other modules. As soon as both modules send an error signal, the voting control module generates a bridging command and forwards it to the bridging module, which executes the command.

SUMMARY

It is an object of the present invention to provide an improved system for operating a vehicle.

According to a first aspect of the present invention, the object is achieved by a method for operating an at least partially automated vehicle. In accordance with an example embodiment of the present invention, the method includes the following steps:
- supplying surroundings data detected with the aid of sensors to at least three AI computing units which are independent of one another;
- generating data regarding at least one object from the surroundings data;
- carrying out a plausibility check of the pieces of data with respect to one another with the aid of a majority voting; and
- using the data for which the plausibility check has been carried out for controlling, at least in a semi-automated manner, a lateral and/or longitudinal guidance of the at least partially automated vehicle.

In this way, majority voting is carried out in a safety context of automated driving, data regarding a space detected by the sensor device being generated. Instead of a customary safety mechanism, the described method uses a majority voter, which is fed output data of pretrained AI computing units. The subject matter of the majority voting is a property of a detected object, such as, for example, a position of an open space, an object or an extension, a movement direction of a vector of an object, etc. Using the majority voting, it is checked whether the data are consistent with one another in terms of content. When two identical data are present, these agreeing data are considered to be plausible data.

According to a second aspect of the present invention, the object is achieved by a system for controlling, at least in a semi-automated manner, a lateral and/or longitudinal guidance of an at least partially automated vehicle. In accordance with an example embodiment of the present invention, the system includes the following:
- at least one input, which is configured to receive surroundings data detected with the aid of sensors, which were evaluated by three mutually independent AI computing units to obtain data regarding at least one object;
- a majority voter, which is designed to carry out a plausibility check of the pieces of data with respect to one another with the aid of majority voting to obtain object data; and
- an output for providing the object data for controlling, at least in a semi-automated manner, a lateral and/or longitudinal guidance of the at least partially automated vehicle.

Advantageous refinements of the method in accordance with the present invention are disclosed herein.

One advantageous refinement of the method of the present invention provides that a recognition of an open space, and/or a recognition of an optical flow of the at least one object, and/or a creation of a movement vector of the at least one object, including its lack of definition, and/or an open space detection is/are carried out with the aid of the AI computing units based on the data. In this way, useful pieces of information are generated by the independent AI algorithms, which are subsequently evaluated with the aid of majority voting.

Another advantageous refinement of the method of the present invention provides that the AI computing units are checked using specific measurable characterizing parameters, detected with the aid of sensors, of the at least one detected object. When using the measurable characterizing parameters, key parameters are utilized which may be evaluated and checked in a simple manner. With the aid of these key parameters, the surroundings data provided by the sensor units may be checked in an efficient manner.

Another advantageous refinement of the method of the present invention provides that a diagnosis of a system carrying out the method is carried out with the aid of a diagnostic unit.

Another advantageous refinement of the method of the present invention provides that data are provided from the data of the diagnostic unit, which indicate to what extent the system is reliable. In this way, it is possible to provide information, with the aid of degradation, as to what extent the system is reliable. In this way, specific information may be provided with respect to specific sensor units, for example a piece of information that data of a camera are no longer trustworthy. This may have been caused, for example, by moisture in the form of fog, rain, snow on a front lens of the camera, by which a functional capability of the camera may be significantly reduced, and a cleaning or repair of the camera is required.

Another advantageous refinement of the method of the present invention provides that the data are used within the vehicle and/or are submitted to a transmission unit, which submits the data wirelessly to the at least partially automated vehicle. Advantageously, different usage options of the data are provided in this way. For example, the data may be used directly for the operation within the at least partially automated vehicle, or the data are submitted to an infrastructure, which wirelessly submits the data in the form of control data to the at least one partially automated vehicle.

Another advantageous refinement of the method of the present invention provides that the AI computing units are independent in terms of the data and the system. This advantageously supports an independence of the AI computing units, by which, ultimately, a perspective made up of different aspects of the surroundings data detected by the sensors may be obtained. A plausibility of the surroundings data provided by the sensor units may be significantly increased in this way.

Further advantageous refinements of the method of the present invention provide that surroundings data of a single sensor type are supplied to the AI computing units.

Further advantageous refinements of the method of the present invention provide that surroundings data of technically diversified sensor types are fed to the AI computing units. Advantageously, surroundings data are detected by specific sensor units in the described manners, thereby supporting a high design freedom for the sensor device for specific applications.

Further advantageous refinements of the method of the present invention provide that map data and/or location data continue to be used. Advantageously, in this way a piece of position information of the sensors may be related to map information and/or a point in time. In this way, a static view of the surroundings is advantageously also incorporated. A diagnosis of the overall system is even further improved in this way.

The present invention is described in detail hereafter with further features and advantages based on several figures. The figures are primarily intended to illustrate the main features of the present invention and are not necessarily shown true to scale.

Described method features result similarly from correspondingly described device features, and vice versa. This means in particular that features, technical advantages and statements regarding the method result similarly from corresponding statements, features and advantages regarding the system, and vice versa.

DETAILED DESCRIPTION OF EXAMPLE EMBODIMENTS

Figure 1:
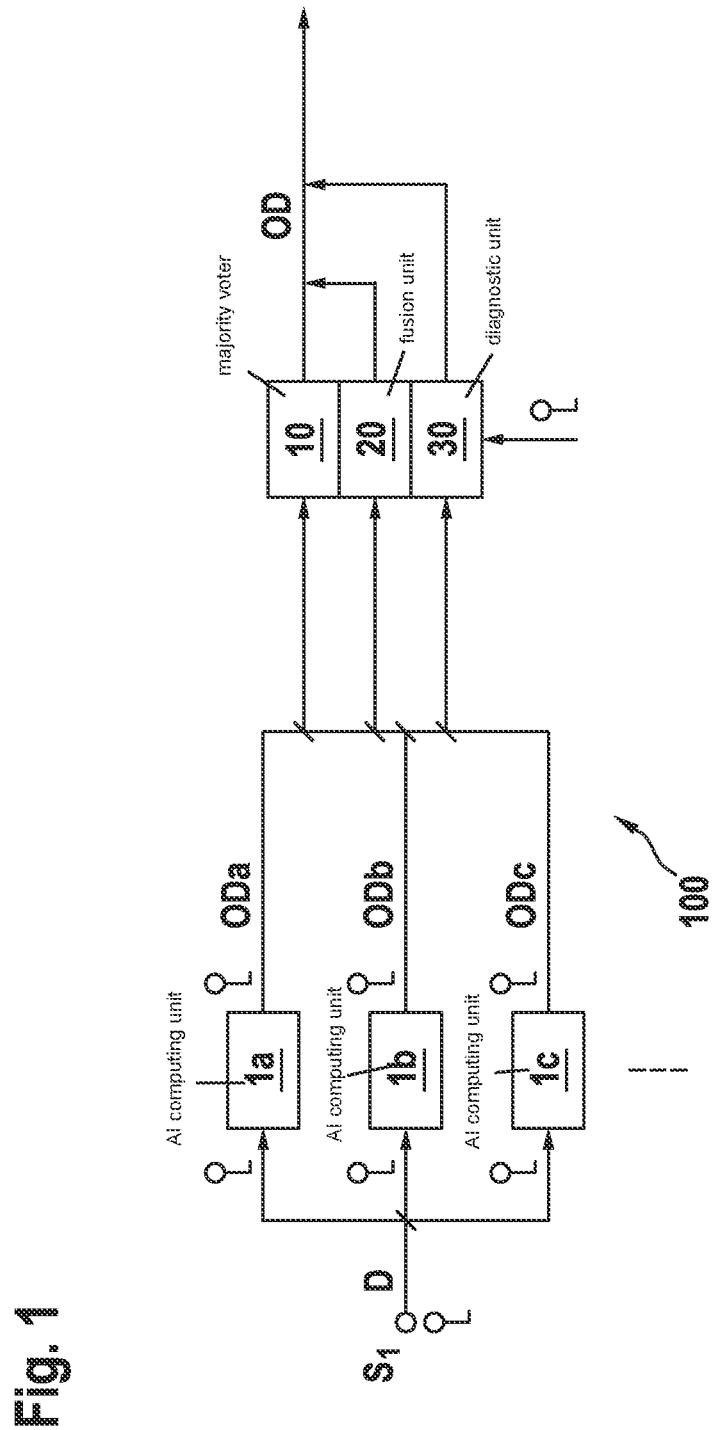
FIG. 1 shows an overview image including a schematic representation of a provided system, in accordance with an example embodiment of the present invention.

Hereafter, the expression "carrying out a plausibility check with the aid of majority voting" shall be understood to mean a checking of data during which a majority of data indicate a correctness of the data. Majority voting shall, in particular, be understood not to mean a logical voting or plausibility check.

The wording "at least partially automated guidance" encompasses one or more of the following cases: assisted guidance, semi-automated guidance, highly automated guidance, fully automated guidance.

Assisted guidance means that a driver of the motor vehicle permanently carries out either the lateral guidance or the longitudinal guidance of the motor vehicle. The respective other driving task (i.e., a controlling of the longitudinal guidance or of the lateral guidance of the motor vehicle) is carried out automatically. This means that either the lateral guidance or the longitudinal guidance is automatically controlled in the case of an assisted guidance of the motor vehicle.

Semi-automated guidance means that, in a specific situation (for example: driving on an expressway, driving within a parking facility, passing an object, driving within a lane established by lane markings) and/or for a certain time period, a longitudinal guidance and a lateral guidance of the motor vehicle are automatically controlled. A driver of the motor vehicle does not personally have to manually control the longitudinal and lateral guidance of the motor vehicle. However, the driver must permanently monitor the automatic control of the longitudinal and lateral guidance to be able to manually intervene when needed. The driver must be prepared at any time to completely take over the motor vehicle guidance.

Highly automated guidance means that, in a specific situation (for example: driving on an expressway, driving within a parking facility, passing an object, driving within a lane established by lane markings), a longitudinal guidance and a lateral guidance of the motor vehicle are automatically controlled for a certain time period. A driver of the motor vehicle does not personally have to manually control the longitudinal and lateral guidance of the motor vehicle. The driver does not have to permanently monitor the automatic control of the longitudinal and lateral guidance to be able to manually intervene when needed. When needed, a take-over request is automatically output to the driver for taking over the control of the longitudinal and lateral guidance, in particular, is output with a sufficient time reserve. The driver thus must be potentially in a position to take over the control of the longitudinal and lateral guidance. Boundaries of the automatic control of the lateral and longitudinal guidance are automatically recognized. In the case of a highly automated guidance, it is not possible to automatically effectuate a minimal-risk state in any initial situation.

Fully automated guidance means that, in a specific situation (for example: driving on an expressway, driving within a parking facility, passing an object, driving within a lane established by lane markings), a longitudinal guidance and a lateral guidance of the motor vehicle are automatically controlled. A driver of the motor vehicle does not personally have to manually control the longitudinal and lateral guidance of the motor vehicle. The driver does not have to monitor the automatic control of the longitudinal and lateral guidance to be able to manually intervene when needed. Before the automatic control of the lateral and longitudinal guidance is ended, the driver is automatically prompted to take over the driving task (control of the lateral and longitudinal guidance of the motor vehicle), in particular with a sufficient time reserve. If the driver does not take over the driving task, a return into a minimal-risk state is automatically carried out. Boundaries of the automatic control of the lateral and longitudinal guidance are automatically recognized. In all situations, it is possible to automatically return into a minimal-risk system state.

Conventional voting systems are, in general, based on passive electronics or microcontrollers, which originally were not developed for specific safety tasks and only evaluate a functional effect of electrical signals present at the voter. For example, in the case where two independent electrical signals express that an actuator is to increase its power, and another electrical signal requests a reduction in the power, a simple 2-out-of-3 voting would increase the power of the actuator.

Hereafter, AI shall be understood to mean non-deterministic algorithms, which are known in their computing depth. This may be algorithms of machine learning or another computing scheme. Each individual AI may have other learning effects per se, the AIs, however, not being trained jointly with respect to one another. In this way, an independent mode of operation of the respective AIs is supported. Advantageously, the AIs may continually learn further in the conventional manner during the run time.

A method is described, in which, e.g., in the case of a 2-out-of-3 voting, even with two identical incorrect pieces of information or a deviation from a specified normal, normal value or limiting value, or the like (e.g., maintaining a speed of a vehicle at a constant 50 km/h with a largely undisrupted, average traffic volume), it is possible, to the extent possible, to prevent a case in which the controlled vehicle is jeopardized. As soon as a deviation from this specified normal value is present, this is a violation, which influences a system behavior in a defined form. Using a voter, it is also easily possible to implement the handling of multiple errors according to ASIL D as set out in ISO 26262, since different criteria are taken into consideration at different levels in the voter, and also in the data streams which are provided in three or more voters.

Functional votings may also be conditionally usable, so that different pieces of information for "voting" are supplied to the voter under certain conditions. For highly available systems, the voter may also be redundantly designed; here, care should be taken that both voters do not fail simultaneously due to an outside circumstance (e.g., electrical power failure). In this way, potential error consequences are safeguarded against.

The conditional majority voter may thus be arbitrarily configured, and may evaluate different data streams based on a wide variety of parameters, and thus safely activate an actuator based on different factors. Such distinctions may be dependent on the following states:

operating states of the vehicle (vehicle accelerates, decelerates, etc.)

system states (e.g., control units are undergoing initialization, reconfiguration, defect, etc.)

traffic situations (e.g., driving on expressway, busy road, etc.)

In particular, in the case of a surroundings sensor system, the systems may be switched to better systems or evaluation algorithms in the case of potential technical shortcomings. In addition to the technical shortcomings of the sensors and evaluation algorithms, possible subsequent error effects from the surroundings thus also become adaptable:

temperature, dirt, etc. may distort the measuring results rain, snow, fog may limit the recognition capability electrical faults and tolerances (component noise, EMC, etc.) may distort the result deviations from a specified normal The technical systems may be calibrated or configured to be temporally variable, so that the majority voter "suppresses" or does not consider results of technical elements in the form of surroundings sensors for a certain time period.

A considerable advantage of the provided method is based on the fact that a safety verification is no longer based on an error integrity of the carrier system (including sensors), but exclusively with regard to a potential influence on the safety of the vehicle. Diagnostic unit 30, fusion unit 20 and majority voter 10 as well as an actuator activation are thus implemented according to safety requirements. Diverse functions which are provided by pretrained AI computing units 1$a$ . . . 1$d$ are only subject to the analysis for errors having a common cause, but are not necessary as an implemented safety mechanism in road traffic. In connection with the present patent application, the term "diverse" shall be understood to mean "based on different principles." Diverse functions or diverse algorithms are thus those which are based on different computing or evaluation principles.

It is also possible to handle unusual influences in this way, since these are recognized as unusual by majority voter 10 (e.g., there are combinations which are not logical) and, for example, the at least partially automated vehicle may then be accordingly degraded in its function (e.g., by being decelerated, guided onto a different route, etc.).

If, for example, at least two, preferably at least three, useful AI algorithms which run on AI computing units 1$a$ . . . 1$n$ and pursue comparable goals, are available, such as, e.g.

object detection open space detection provision of optical flow (object tracking or detection of movement vectors of bodies (3D element))

majority voter 10 may provide a piece of logic information as to whether a relevant area of the surroundings is negotiable for the at least partially automated vehicle from three different AI algorithms running on AI computing units 1$a$ . . . 1$d$ as diverse algorithms.

Since, in general, usually multiple surroundings sensors are present, systematic HW errors may occur by a system comparison either crosswise or in a superimposed system. In the case of artificial intelligence AI (e.g., in the form of a neural network, a machine learning system or the like), the reference to the hardware on which the function is running and the systematic error of the described hardware will no longer be comprehensible. The detection of the "real world" cannot be detected and is not checkable, or cannot even be reasoned from a safety point of view, using diagnoses.

However, similarly to the artificial intelligence AI, this may be carried out in a reliable manner or "safely" via logic functions or different perspectives of the sensors, which is utilized in the provided method.

In this way, pieces of information regarding an object may be extracted from the surroundings data, such as, e.g., traffic light including colors, open spaces, sequences of color changes of the traffic light (red-yellow-green), etc.

Since diagnoses are usually time-consuming, and the data may first be analyzed during monitoring, the provided majority voting architecture may also be utilized to only route data through when values are logically plausible, without making a further processing of the data dependent on a diagnostic result to be awaited.

For example, a result of a 2-out-of-3 voter (two results agree, a third result deviates) could be that the pieces of information of the diagnosis must be awaited, whereas a result of a 3-out-of-3 voter states that the pieces of information of the diagnosis may be dispensed with.

Using such a majority voter 10, it is possible, e.g., with little complexity, to implement a rapid ASIL D router or a radio modem for an at least partially automated driving function.

It is provided that pieces of information, which were generated from the pieces of sensor information with the aid of a pretrained AI computing unit $1a \ldots 1n$, are subjected to a majority voting, not data which were detected by one or multiple surroundings sensor(s). Pretrained AI computing units $1a \ldots 1n$ may assess a situational context of surroundings data D which were formed by one or also multiple surroundings sensor(s) (or corresponding data source(s)), or may carry out a plausibility check of corresponding pieces of object data ODa ... ODn with respect to one another, by which surroundings data D detected by sensor units $S_1 \ldots S_n$ may be efficiently utilized.

In the present case, this means that surroundings data D detected by sensor units $S_1 \ldots S_n$ only play a subordinate role for the actual voting process. At least three different AI computing units $1a \ldots 1n$, which are based on different training principles and different AI algorithms, may in this way assess errors in system 100, and also during the perception of the "real world information," based on the results of voter 10. Others (also different sensors) may be integrated into the individual strands leading to voter 10, which, similarly to humans, only provide a contribution in the learning phase during the development and during the operating time, so that the sources for the result may even be unknown at the development time.

FIG. 1 shows a schematic block diagram of one specific embodiment of a provided system 100 including functional blocks as well as their logic dependencies on one another. A sensor device including a sensor unit $S_1$, e.g., in the form of a camera, which provides camera data, is apparent. The sensor unit may also be designed as radar, LIDAR, etc. Surroundings data D detected by sensor unit $S_1$ may be processed largely independently of one another in redundantly independent evaluation systems using a voter 10, a fusion unit 20, and a diagnostic unit 30.

In the process, a fusion unit 20 fuses object data ODa ... ODn provided by AI computing units $1a \ldots 1n$, a diagnostic unit 30 carrying out a diagnosis of described object data ODa ... ODn with the aid of key parameters of surroundings data D, which are also used by AI computing units $1a \ldots 1d$. Output data of voter 10 in the form of object data OD are in this way monitored by fusion unit 20 and diagnostic unit 30. The described output data OD may, for example, be used within the at least partially automated vehicle for an actuator activation. Object data OD provided by voter 10 may, for example, also be submitted to infrastructure units (road side units, RSU), which submit object data OD wirelessly to the at least partially automated vehicle. The key parameters are generated at the input, and they are then checked at the output. The key parameters represent mechanisms with the aid of which the AI is rendered monitorable, in this way the AI being rendered assessable. As a result, a quality of the AI may be established using the key parameter.

In this way, random HW errors, and also systematic errors of sensor units $S_1 \ldots S_n$ used, and of the computing unit on which the AI is executed, may be largely precluded, since a simultaneity of the systematic errors may be used as a criterion for the improbability. For example, an EMC problem cannot simultaneously impact two different signals of sensor units $S_1 \ldots S_n$ with the same effect.

The sensor fusion of the processed surroundings data D with the aid of fusion unit 20 as well as the obtaining of information, for example by AI computing units $1a \ldots 1c$ using AI algorithms (e.g., for the purpose of an object detection, object tracking, generation of optical flow, recognition of open space in the surroundings of the vehicle, etc.) are preferably carried out on physically different electronic computing units which are independent of one another, random hardware errors being detectable by a comparison of results of the redundancy.

The hardware and the software in the case of sensor units $S_1 \ldots S_n$ designed, for example, as cameras, including three downstream diverse AI computing units $1a \ldots 1c$, may supply pieces of diagnostic information. Sensor units $S_1 \ldots S_n$, in general, each have their own weaknesses, e.g., a radar sensor or a LIDAR sensor is not able to recognize colors, whereas a camera, in general, has weaknesses in the detection of distances and velocities of objects.

Key parameters indicated as keys are apparent at the input and at the output of AI computing units $1a \ldots 1c$, with the aid of which surroundings data D supplied to the AI computing units, and object data ODa ... ODn ascertained by AI computing units $1a \ldots 1n$, are checked. The key parameters of the detected surroundings data may be of different types:

- values as parameters of the real world, such as, e.g., size, properties, distance from objects, open spaces, properties of movement vectors, etc.
- parameters from the situational context, such as, e.g., time, sequence, order, etc.
- data-related parameters resulting from properties of the data flow, such as, e.g., separation value, safety container, confidence value, or
- parameters regarding errors or erroneous interventions (e.g., by hackers), such as, e.g., intrusion, etc.

If system 100 is to be able to meet safe requirements regarding availability (e.g., for steering maneuvers during highly automated driving operation), an actuator activation of the vehicle should preferably take place via redundant voters (not shown), which is able to carry out a synchronization and simultaneity analysis. It is advantageous in the process when redundant routes to voter 10 are not influenced to the extent possible, so that no errors occur along the described event chain due to so-called common cause effects (effects as a result of a shared cause). Failures as a result of a shared cause (failures due to a common cause, commonly caused failures, common cause failures) are referred to in the risk analysis as failures of multiple components or systems which occur as a consequence of an individual error cause or an individual event. Their failure behavior is thus statistically dependent, on one another.

The at least partially automated vehicle (not shown) may include a vehicle-based surroundings detection system (on-board perception), such as, e.g., a video and/or LIDAR and/or radar and/or ultrasonic sensor system for detecting pieces of surroundings information of the vehicle, for carrying out the provided method. Furthermore, the described surroundings detection system may at least partially also be situated in an infrastructure in the surroundings of the vehicle.

The described arrangement of system 100 of FIG. 1 thus shows a majority voting of output data of three diverse AI computing units 1$a$ . . . 1$c$, as well as their monitoring with the aid of a fusion unit 20 and a diagnostic unit 30 (predictive health monitoring), including logic monitoring.

In this way, it is possible, with the aid of system 100, to efficiently check object data ODa . . . ODn (e.g., vehicle, person, static objects, traffic signs, traffic areas, etc.) generated from surroundings data D of sensor units $S_1 \ldots S_n$, a preferably error-free function of sensor device $S_1 \ldots S_n$ is advantageously supported. As a result, an automated vehicle activated with the aid of system 100 may be safely operated.

It is apparent that, in described system 100, surroundings data D of the entire sensor system $S_1 \ldots S_n$ are read into redundant evaluation systems largely independently of one another. In this way, random hardware errors and/or also systematic errors of sensor system $S_1 \ldots S_n$ may be largely precluded.

Functionally and by way of example, a technical implementation of a redundant 2-out-3 voter may be implemented with the aid of the provided system, the conditions and diagnoses, integrity, states being utilized as input for the voter configuration. The voter matrix decides which values are used for the voting. As a result, in this way, e.g., a cross diagnosis of sensor units $S_1 \ldots S_n$ and/or of their inputs may be carried out.

Functionally, a logic plausibility check, diagnosis and status determination may be carried out using the provided system 100, it being possible to make a decision, with the aid of the voter matrix, as to which sensor data are actually used. Advantageously, in this way, e.g., each sensor unit $S_1 \ldots S_n$, in arbitrary functions, may serve as an external monitoring of another sensor.

During the defined evaluation of surroundings data D, detected by the technologically diversified sensor units $S_1 \ldots S_n$, with respect to plausibility, evaluation algorithms may be processed with respect to one another in a defined manner, allowing plausibilities of sensor data to be cross-checked.

In particular, in the case of the surroundings sensor system, the systems may be switched to better systems or evaluation algorithms in the event of potential technical shortcomings. In addition to the technical shortcomings of the sensors and evaluation algorithms, possible error effects from the surroundings are thus also recognized and thereby become adaptable, such as for example:

temperature, dirt, etc. may distort measuring results
rain, snow, fog, etc. may limit a recognition capability
electrical faults and tolerances (e.g., component noise, EMC, etc.) may distort the result of the sensor data The technical systems may be calibrated or configured to be temporally variable, so that voter 10 suppresses the results of these technical elements for the time period.

Figure 2:
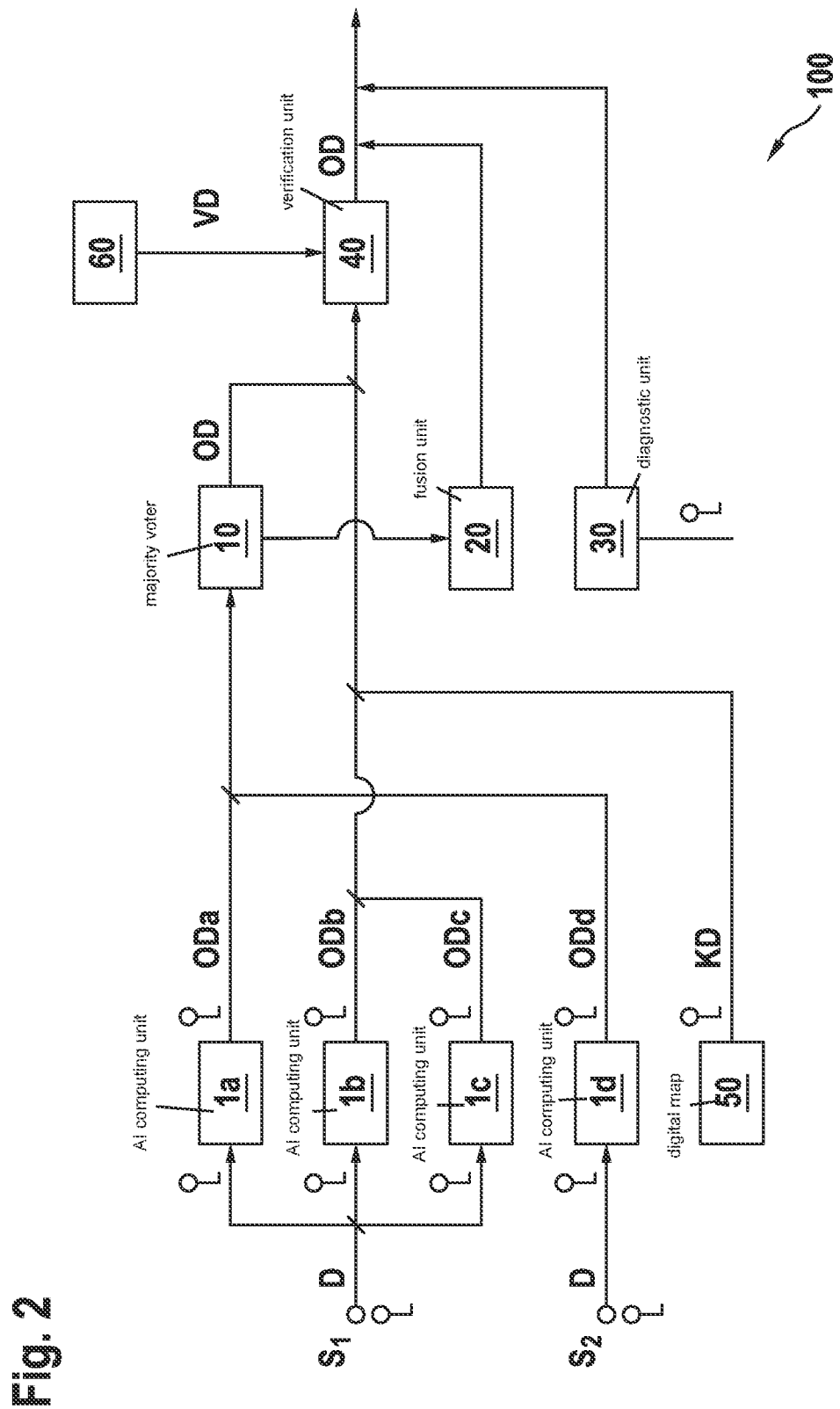
FIG. 2 shows a representation of one further specific embodiment of a provided system, in accordance with an example embodiment of the present invention.

FIG. 2 shows an advantageous refinement of the provided system 100, including a supplementation of the voting by a further sensor unit S2. Sensor unit $S_2$ may, for example, be designed as a radar sensor, whose detected surroundings data D are processed with the aid of an AI computing unit 1$d$ into object data ODd, which are supplied to voter 10 together with object data ODa of sensor unit 1$a$ designed as a camera.

Furthermore, it is also apparent that map data KD of a digital map 50 and location data VD (e.g., of a GPS system) are used. Location data VD and map data KD are deterministic elements in the process, which relate object data ODa . . . ODn with respect to one another. In the process, map data KD and location data VD are supplied to a verification unit 40, which relates object data OD of voter 10 to map data KD and location data VD to one another. Similarly, to the specific embodiment of FIG. 1, key parameters are also processed with the aid of a diagnostic unit 30 here, a degradation value for object data OD being thereby ascertained.

For example, the provided system 100 may be used to activate actuators of an at least semi-automated vehicle in the area of automated driving. As an alternative or in addition, object data ODa . . . ODn of system 100 may be integrated into simulation processes.

The provided system 100 may, e.g., be implemented on a road side unit (RSU) within the scope of a Car-to-X (C2X) communication infrastructure. In the process, e.g., pieces of information about the road condition, the traffic flow, about traffic jams, potential hazards such as accidents, oncoming vehicles or broken-down vehicles, etc., may be exchanged. The road side units may receive the described pieces of information via the Car-to-Infrastructure communication and forward it to the correct road users.

Figure 3:
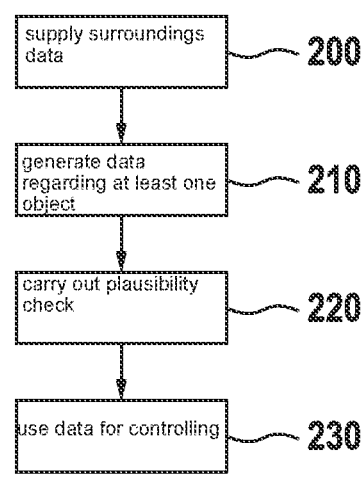
FIG. 3 shows a schematic flowchart of a provided method for operating an at least partially automated vehicle, in accordance with an example embodiment of the present invention.

FIG. 3 shows a schematic sequence of one specific embodiment of the described method.

In a step 200, surroundings data D detected with the aid of sensors are supplied to at least three AI computing units 1$a$ . . . 1$n$ which are independent of one another.

In a step 210, data (ODa . . . ODn) regarding at least one object are generated from the surroundings data.

In a step 220, a plausibility check of pieces of data ODa . . . ODn with respect to one another is carried out using a majority voting.

In a step 230, data OD for which the plausibility check has been carried out are used for controlling, at least in a semi-automated manner, a lateral and/or longitudinal guidance of the at least partially automated vehicle.

Advantageously, the provided method may be implemented in the form of a software program including suitable program code, which runs on system 100 for operating a vehicle. This enables an easy adaptability of the method.

Those skilled in the art will suitably modify the features of the present invention and/or combine them with one another, without departing from the core of the present invention.

What is claimed is:

1. A method for operating an at least partially automated vehicle, including the following steps:
supplying surroundings data detected using sensors to at least three AI computing units which are independent of one another;
generating data, by each of the AI computing units, regarding at least one object, from the supplied surroundings data;
carrying out a plausibility check of the generated data with respect to one another using majority voting; and
using the generated data for which the plausibility check has been carried out for controlling, at least in a semi-automated manner, a lateral and/or longitudinal guidance of the at least partially automated vehicle.

2. The method as recited in claim 1, wherein a recognition of an open space, and/or a recognition of an optical flow of the at least one object, and/or a creation of a movement vector of the at least one object, including a lack of definition of the movement vector of the at least one object, and/or an open space detection is/are carried out using the AI computing units based on the generated data.

3. The method as recited in claim 1, wherein the AI computing units are checked using specific measurable characterizing parameters, which are detected using sensors, of the at least one object.

4. The method as recited in claim 1, wherein a diagnosis of a system carrying out the method is carried out using a diagnostic unit.

5. The method as recited in claim 4, wherein data which indicate to what extent the system is reliable are provided from the data of the diagnostic unit.

6. The method as recited in claim 4, wherein the data are used within the vehicle and/or are submitted to a transmission unit, which submits the data wirelessly to the vehicle.

7. The method as recited in claim 1, wherein the AI computing units are configured to be independent of one another in terms of data and system.

8. The method as recited in claim 1, wherein the AI computing units are supplied with surroundings data of a single sensor type.

9. The method as recited in claim 1, wherein the AI computing units are supplied with surroundings data of technically diversified sensor types.

10. A system for controlling, at least in a semi-automated manner, a lateral and/or longitudinal guidance of an at least partially automated vehicle, comprising:

at least one input of an AI computing unit configured to receive surroundings data detected using sensors, the surroundings data having been respectively evaluated by three mutually independent AI computing units to obtain respective data regarding at least one object;

a processor, configured to carry out a plausibility check of the obtained respective data with respect to one another using majority voting to obtain object data; and an output of the AI computing unit configured to provide the object data for controlling, at least in a semi-automated manner, a lateral and/or longitudinal guidance of the at least partially automated vehicle.

11. The system as recited in claim 10, which is implemented on an electronic control unit of the at least partially automated vehicle.

12. The system as recited in claim 10, which is implemented on a road side unit.

13. A non-transitory computer-readable data medium on which is stored a computer program including program code for operating an at least partially automated vehicle, the program code, when executed by a computer, causing the computer to perform the following steps:

supplying surroundings data detected using sensors to at least three AI computing units which are independent of one another;

generating data, by each of the AI computing units, regarding at least one object, from the supplied surroundings data;

carrying out a plausibility check of the generated data with respect to one another using majority voting; and using the generated data for which the plausibility check has been carried out for controlling, at least in a semi-automated manner, a lateral and/or longitudinal guidance of the at least partially automated vehicle.

* * * * *